(12) United States Patent
Parkinson

(10) Patent No.: US 10,595,568 B2
(45) Date of Patent: Mar. 24, 2020

(54) EXPANDABLE CUP FOR A SUPPORT GARMENT

(71) Applicant: NIKE, Inc., Beaverton, OR (US)

(72) Inventor: Adam Parkinson, Portland, OR (US)

(73) Assignee: NIKE, Inc., Beaverton, OR (US)

(*) Notice: Subject to any disclaimer, the term of this patent is extended or adjusted under 35 U.S.C. 154(b) by 27 days.

(21) Appl. No.: 15/983,416

(22) Filed: May 18, 2018

(65) Prior Publication Data

US 2018/0343929 A1 Dec. 6, 2018

Related U.S. Application Data

(60) Provisional application No. 62/512,417, filed on May 30, 2017.

(51) Int. Cl.
*A41C 3/12* (2006.01)
*A41C 3/00* (2006.01)
(Continued)

(52) U.S. Cl.
CPC .............. *A41C 3/0028* (2013.01); *A41C 3/12* (2013.01); *A41F 15/002* (2013.01); *B32B 5/26* (2013.01);
(Continued)

(58) Field of Classification Search
CPC ....... A41C 3/0028; A41C 3/12; A41F 15/002; A32B 5/26
(Continued)

(56) References Cited

U.S. PATENT DOCUMENTS 1,965,997 A 7/1934 Cochrane-Wilkinson
2,302,517 A 11/1942 Berk
(Continued)

FOREIGN PATENT DOCUMENTS

CN 104256916 A 9/2014
GB 877004 9/1961
(Continued)

OTHER PUBLICATIONS

International Search Report and Written Opinion dated Aug. 22, 2018 in PCT/US2018/034070, 10 pages.
(Continued)

*Primary Examiner* — Gloria M Hale
(74) *Attorney, Agent, or Firm* — Shook, Hardy & Bacon, LLP

(57) ABSTRACT

A breast cup for a support garment is provided. The breast cup includes a support cup portion, a first gusset extending between an upper-lateral quadrant and a lower-lateral quadrant of the support cup portion, and a second gusset extending between an upper-medial quadrant and a lower-medial quadrant of the support cup portion. The first and second gussets may both comprise a lower modulus of elasticity than the support cup portion and may be configured to expand from a first configuration to a second configuration. When integrated into a support garment, the breast cup may be coupled to an under band portion via a lower gusset that is configured to expand from a first configuration to a second configuration. When worn, the first and second gussets and the lower gusset facilitate a comfortable and supportive fit as the shape of a wearer's breast changes due to adjustments in tension.

20 Claims, 7 Drawing Sheets

(51) Int. Cl.
 *A41F 15/00* (2006.01)
 *B32B 5/26* (2006.01)
(52) U.S. Cl.
 CPC .......... *A41C 3/0007* (2013.01); *A41C 3/0057* (2013.01); *B32B 2437/00* (2013.01)
(58) Field of Classification Search
 USPC ........................................................ 450/65
 See application file for complete search history.

(56) References Cited

U.S. PATENT DOCUMENTS

| | | | |
|---|---|---|---|
| 2,328,673 A | 9/1943 | Rasch | |
| 2,437,655 A | 3/1948 | Rosner | |
| 2,446,437 A | 8/1948 | Schoebel | |
| 2,517,287 A | 8/1950 | Corbeil | |
| 2,540,631 A | 2/1951 | Nelson | |
| 2,560,706 A | 7/1951 | Spetalnik | |
| 2,764,760 A * | 10/1956 | Kaufman | A41C 3/0028 450/65 |
| 2,842,137 A | 7/1958 | Becker | |
| 2,912,985 A | 11/1959 | Plehn | |
| 2,986,143 A | 5/1961 | Erteszek | |
| 3,036,575 A | 5/1962 | Morehouse | |
| 3,067,751 A | 12/1962 | Steiner | |
| 3,196,460 A | 8/1965 | Halstead | |
| 3,353,540 A | 11/1967 | Erteszek | |
| 3,396,729 A | 8/1968 | Glick | |
| 3,516,415 A | 6/1970 | Hadley-Webb | |
| 3,537,279 A | 11/1970 | Epley | |
| 3,814,107 A | 6/1974 | Greenblatt et al. | |
| 4,767,377 A | 8/1988 | Falla | |
| 5,167,566 A | 12/1992 | Novitsky et al. | |
| 5,643,043 A | 7/1997 | Pflum | |
| 8,523,629 B2 | 9/2013 | Pundyk | |
| 2014/0087624 A1* | 3/2014 | Yuasa | A41C 3/12 450/1 |
| 2018/0343929 A1* | 12/2018 | Parkinson | A41F 15/002 |

FOREIGN PATENT DOCUMENTS

| | | |
|---|---|---|
| GB | 1218979 | 1/1971 |
| WO | 2007016404 A1 | 2/2007 |

OTHER PUBLICATIONS

Amazon, "Pure Lime High Impact Sports Bra", https://www.amazon.com/Pure-Lime-High-Impact-Sports/dp/8004X29A48, Amazon.com, ASIN: B004X29A48, May 3, 2008, 4 pages.

East Dane, "MICHI Avalon Bra Bikini Top", https://www.eastdane.com/avalon-bra-bikini-top-michi/vp/v=1/1595793535.htm, eastdane.com, Style # MICHI30026, accessed Mar. 2017, 1 page.

AliExpress, "Women Seamless Adjustable Shoulder Strap Sports Bras Stretch Workout Fitness Bras", https://www.aliexpress.com/item/Women-Seamless-Adjustable-Shoulder-Strap-Sports-Bras-Stretch-Workout-Fitness-Bras/32636623386.html, aliexpress.com, accessed Mar. 2017, 8 pages.

* cited by examiner

EXPANDABLE CUP FOR A SUPPORT GARMENT

CROSS-REFERENCE TO RELATED APPLICATIONS

This application having attorney docket number NIKE.293259/170100US02 and entitled "EXPANDABLE CUP FOR A SUPPORT GARMENT" claims the benefit of priority of U.S. Provisional Application No. 62/512,417, entitled "EXPANDABLE CUP FOR A SUPPORT GARMENT," and filed on May 30, 2017, which is incorporated by reference in its entirety.

BACKGROUND

Conventional support garments, such as bras, typically provide support by using materials or fabrics that compress the chest area, including the wearer's breast, and often provide adjustable levels of support by adjustable straps, which change the compression of the breasts. As a result to changes in the level of compression, the wearer's breasts typically change shape and, at times, are displaced outside the support garment.

BRIEF DESCRIPTION OF THE DRAWINGS

Examples of the present invention are described in detail below with reference to the attached drawing figures, wherein.

DETAILED DESCRIPTION

Figure 1:
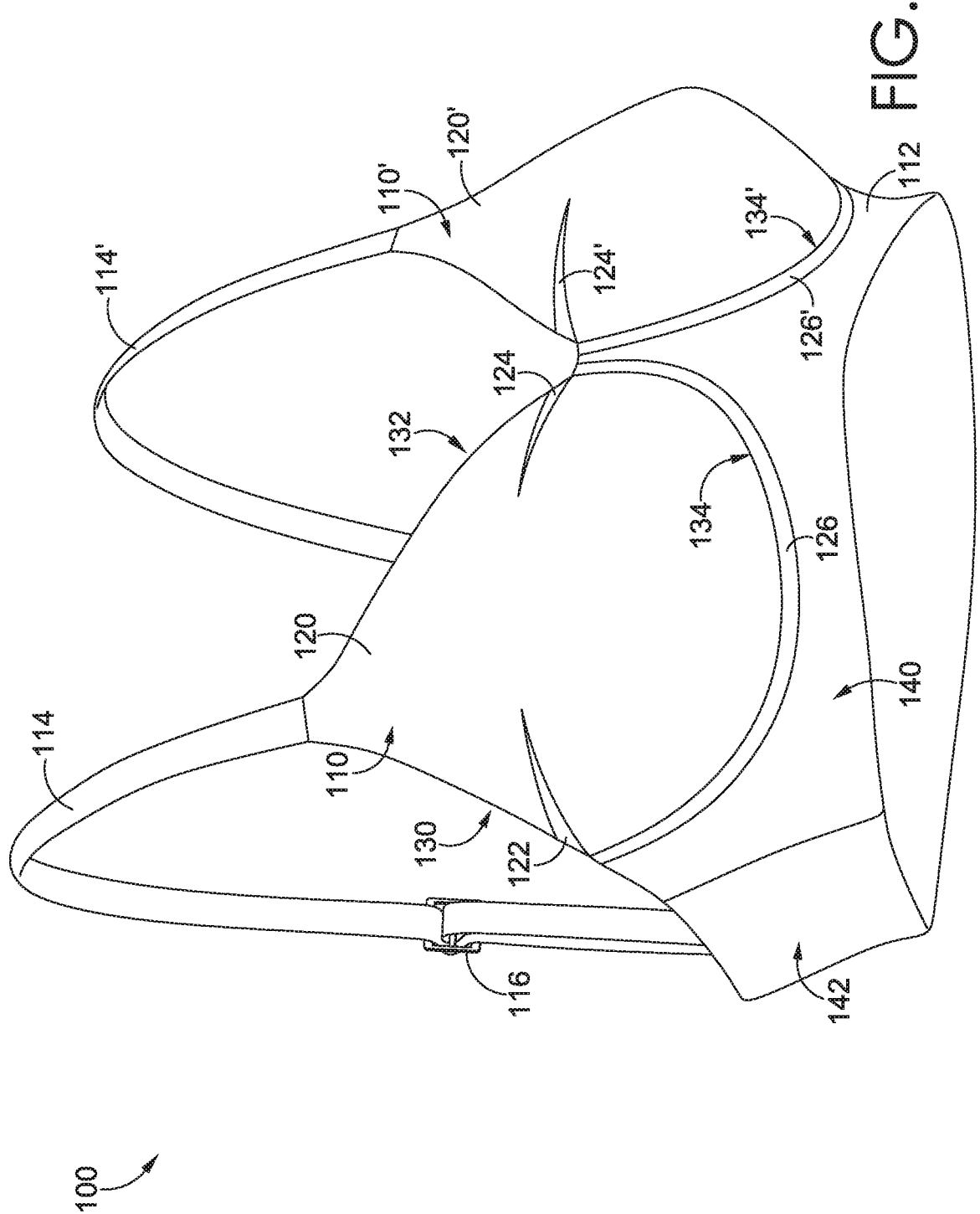
FIG. 1 illustrates a front perspective view of an exemplary support garment in the form of a bra having expandable breast cups, in accordance with an aspect herein.

The subject matter of the present invention is described with specificity herein to meet statutory requirements. However, the description itself is not intended to limit the scope of this disclosure. Rather, the inventors have contemplated that the disclosed or claimed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

At a high level, aspects herein are directed toward a breast cup for a support garment, such as a bra, that includes gussets to allow the cup to conform to the changing shape of a wearer's breast when tension is applied to the cup. As used herein, the term "gusset" may be defined as a piece of material that is incorporated into, for instance, a breast cup that is useable for enlarging at least a portion of the breast cup in certain situations. It is often desirable to adjust or increase the level of support in a support garment, especially a sport bra. As tension is applied to the support garment through, for instance, compression fabrics and/or tension adjustment mechanisms on the straps, a wearer's breasts are often compressed towards the wearer's body. While this compression provides additional support, it also causes the wearer's breasts to change shape within the cup. Breast cups typically do not easily adapt to conform to the changing breast shape, restricting the wearer's comfort. Additionally, failure to adequately conform to the changing shape sometimes leaves greater portions of the wearer's breast exposed outside of the cup. For example, the lateral and medial sides of a wearer's breasts are susceptible to becoming exposed and being left without support when tension is applied to the breast cups.

Accordingly, aspects disclosed herein are directed to a breast cup having gussets that expand as tension is applied to provide a comfortable and supportive fit. The cup may comprise a support cup portion, a first gusset positioned between an upper-lateral quadrant and a lower-lateral quadrant of the support cup portion, and a second gusset positioned between an upper-medial quadrant and lower-medial quadrant of the support cup portion. The gussets may be configured to expand from a first configuration to a second configuration due, at least in part, to being formed from a lower modulus of elasticity material, such as an elastically resilient material. The modulus of elasticity of the gussets may be lower than the modulus of elasticity of the support cup portion. The differential elasticity between the gussets and the support cup portion may facilitate the expansion from a first configuration to a second configuration while still providing the additional support that is sought through increased tension.

The positioning of the gussets within the breast cup helps provide a more comfortable fit to targeted areas when tension is adjusted. Specifically, as tension is increased and the wearer's breasts are compressed towards the chest, there is a tendency for the lateral portions and the medial portions of the breasts to be displaced in lateral and medial directions, respectively. The first gusset positioned between an upper-lateral quadrant and a lower-lateral quadrant of the support cup portion may extend from the first configuration to the second configuration to accommodate the lateral portion of the wearer's breast as it is moved laterally due to the increased tension. Similarly, the second gusset positioned between an upper-medial quadrant and lower-medial quadrant of the support cup portion may extend from the first configuration to the second configuration to accommodate the movement of the medial portion as it is displaced in a medial direction. By extending to the second configuration, the gussets provide more space within the cup to comfortably provide coverage of the wearer's breast while maintaining the increased level of support desired from the increased tension. When tension to the breast cups is decreased, the gussets may contract back to the first configuration as the lateral and medial portions of the wearer's breasts may have a tendency to move inward.

Similarly, in some aspects, the breast cup may comprise a third gusset extending within one or more upper quadrants of the support cup portion, such as within the upper-medial quadrant or between the upper-medial quadrant and the upper-lateral quadrant, and that is expandable from a first configuration to a second configuration. When tension is applied to the cup to provide increased support, the superior portions of the wearer's breasts also have a tendency to be displaced in an upward direction. As such, the third gusset may accommodate the superior portion of a wearer's breast when it expands from the first configuration to the second configuration in a similar manner as the first and second gussets.

Further, because additional support is typically provided through application of an upward tension to breast cups, the increased tension often causes an under band portion of the support garment to move upward, which may displace a lower portion of the wearer's breast outside the breast cup and cause discomfort. Accordingly, some aspects described herein further include gussets positioned between lower margins of the breast cups and an under band portion of the bra. These gussets may be expandable from a first configuration to a second configuration to help the cups maintain a comfortable fit around the inferior portions of a wearer's breasts when tension is increased.

Accordingly, aspects herein are directed to a breast cup comprising a support cup portion, a first gusset expandable from a first configuration to a second configuration, and a second gusset expandable from a first configuration to a second configuration. The support cup portion of the breast cup comprises an upper-lateral quadrant, an upper-medial quadrant, a lower-lateral quadrant, and a lower-medial quadrant. The first gusset is secured to the support cup portion such that it extends between at least a portion of the upper-lateral quadrant and the lower-lateral quadrant of the support cup portion while the second gusset is secured to the support cup portion such that it extends between at least a portion of the upper-medial quadrant and the lower-medial quadrant of the support cup portion. The first gusset has a first modulus of elasticity and the second gusset has a second modulus of elasticity, where the first modulus of elasticity and the second modulus of elasticity are both lower than a third modulus of elasticity of the support cup portion.

In another aspect, a support garment comprises a first breast cup and a second breast cup. The first breast cup comprises a first support cup portion, a first gusset expandable from a first configuration to a second configuration, and a second gusset expandable from a first configuration to a second configuration. The first support cup portion comprises an upper-lateral quadrant, an upper-medial quadrant, a lower-lateral quadrant, and a lower-medial quadrant. The first gusset is secured to the first support cup portion such that it extends between at least a portion of the upper-lateral quadrant and the lower-lateral quadrant of the first support cup portion, and the second gusset is secured to the first support cup portion such that it extends between at least a portion of the upper-medial quadrant and the lower-medial quadrant of the first support cup portion. The first gusset and the second gusset each have a lower modulus of elasticity than the first support cup portion.

The second breast cup similarly comprises a second support cup portion, a third gusset expandable from a first configuration to a second configuration, and a fourth gusset expandable from a first configuration to a second configuration. The second support cup portion comprises an upper-lateral quadrant, an upper-medial quadrant, a lower-lateral quadrant, and a lower-medial quadrant. The third gusset is secured to the second support cup portion such that it extends between at least a portion of the upper-lateral quadrant and the lower-lateral quadrant of the second support cup portion, and the fourth gusset is secured to the second support cup portion such that it extends between at least a portion of the upper-medial quadrant and the lower-medial quadrant of the second support cup portion. The third gusset and the fourth gusset each have a lower modulus of elasticity than the second support cup portion. The support garment further comprises an under band portion extending inferiorly from the first breast cup and the second breast cup, a first strap extending from the first breast cup; and a second strap extending from the second breast cup. In some aspects, a fifth gusset is interposed between the first breast cup and the under band portion and has a lower modulus of elasticity than the first support cup portion, and a sixth gusset is interposed between the second breast cup and the under band portion and has a lower modulus of elasticity than second support cup portion.

In yet another aspect, a breast cup comprises a support cup portion, a first gusset expandable from a first configuration to a second configuration, a second gusset expandable from a first configuration to a second configuration, and a third gusset expandable from a first configuration to a second configuration. The support cup portion comprises a first surface and a second surface opposite the first surface and is defined by an upper-lateral quadrant, an upper-medial quadrant, a lower-lateral quadrant, and a lower-medial quadrant. The first gusset is secured to the support cup portion such that it extends between at least a portion of the upper-lateral quadrant and the lower-lateral quadrant; the second gusset secured to the support cup portion such that it extends between at least a portion of the upper-medial quadrant and the lower-medial quadrant; and the third gusset is secured to the support cup portion such that it extends between at least a portion of the upper-lateral quadrant and the upper-medial quadrant. The first gusset, the second gusset, and the third gusset each have a lower modulus of elasticity than the support cup portion.

Turning to FIG. 1 a front perspective view of a support garment in the form of a bra 100 is provided in accordance with an aspect herein. While aspects discussed herein refer to bras, it will be understood that aspects are not limited to any particular style or type of support garment used to support breast tissue. For example, other support garments may include camisoles, swimwear, tank tops, or other garments with built-in support with adjustable tension. As well, while aspects herein refer to breast cups, it is contemplated that aspects may be applied to any breast contacting surface or material. The depictions in the drawings are for exemplary purposes only and are in no way meant to limit the scope of the present invention. For instance, the bra 100 is depicted as having two separate breast cups 110 and 110', other arrangements are contemplated, such as the bra 100 having a single piece of material extending across the chest region with molded breast cup portions. Further, the bra 100 may comprise front closures, back closures, removable shoulder straps, underwire, and the like. Positional terms as used herein, such as front, back, side, top, bottom, medial, lateral, and the like are to be given their common meaning with respect to the bra 100 being worn as intended and as shown and described herein by a wearer standing in anatomical position. It should be understood that the use of these terms, however, are not meant to depend on a human being for interpretative purposes.

The bra 100 illustrated in FIG. 1 comprises breast cups 110 and 110', an under band portion 112 located under the breast cups 110 and 110', and shoulder straps 114 and 114'. The under band portion 112 comprises a tubular structure or forms a tubular structure when two ends of the under band portion 112 are joined. As such, the under band portion 112 is adapted to encircle a torso area of the wearer when the bra 100 is worn. As used throughout this disclosure, the term "adapted to" when referring to the bra 100 in relation to a wearer, refers to a bra (or other type of support garment) that is appropriately sized for the particular wearer. The shoulder straps 114 and 114' are adapted to extend over a wearer's shoulders when the bra 100 is worn and may have a number of different configurations such as racerback, convertible, standard, and the like. The shoulder straps 114 and 114' may extend from upper margins of the breast cups 110 and 110' to back regions of the under band portion 112 (shown in FIGS. 4A-4B). The shoulder straps 114 and 114' may each include one or more strap adjustment mechanisms 116, such as a strap slide. The strap adjustment mechanisms 116, which may be referred to herein as a tension adjustment mechanism, may be used to adjust the length of the shoulder straps 114 and 114', which, in turn, adjusts the tension to the breast cups 110 and 110'. In other words, when the length of the shoulder straps 114 and 114' is shortened, an upward tension is applied to the breast cups 110 and 110', and when the length of the shoulder straps 114 and 114' is lengthened, the upward tension previously applied to the breast cups 110 and 110' may be reduced. Although not depicted, the bra 100 may have a front closure, a back closure, or the bra 100 may be donned and doffed by pulling the bra 100 over the wearer's head, such as with a traditional sports bra.

The breast cups 110 and 110' are adapted to cover the wearer's breasts when the bra 100 is worn. The breast cups 110 and 110' may be structured or constructed such that they conform generally to the shape of the wearer's breasts. For instance, at least a portion of the breast cups 110 and 110' may comprise molded foam cups. Each breast cup (e.g., 110 and 110') comprises a support cup portion (e.g., 120 and 120'), a first gusset (e.g., 122 and 122'), and a second gusset (e.g., 124 and 124'). As shown in FIG. 1 (and further illustrated in FIG. 3A), the support cup portions 120 and 120' may form the majority of each respective breast cup 110 and 110', with the first gussets 122 and 122' and the second gussets 124 and 124' being positioned within the respective support cup portion 120 and 120'. The first gusset 122 may be generally positioned on the lateral side 130 of the breast cup 110, and the second gusset 124 may be generally opposite the first gusset 122 on the medial side 132 of the breast cup 110. Similarly, the first gusset 122' may be generally positioned on the lateral side 130' of the breast cup 110', and the second gusset 124' may be generally opposite the first gusset 122' on the medial side 132' of the breast cup 110'.

In some aspects, the bra 100 further includes lower gussets (e.g., 126 and 126') interposed between each breast cup 110 and 110' and the under band portion 112. In some aspects, the lower gussets 126 and 126' (which may also be referred to as first lower gusset 126 and second lower gusset 126') extend across the entire length of the lower margins 134 and 134' of the breast cups 110 such that the breast cups 110 and 110' are not directly secured to the under band portion 112. In other aspects, the lower gussets 126 and 126' may extend only partially along the lower margins 134 and 134' of the breast cups 110. Any and all aspects, and any variation thereof, are contemplated as being within the scope herein.

As it will be appreciated, the bra 100 comprises duplicate components on the right and left sides, such as two breast cups (e.g., 110 and 110') that have substantially the same configuration in that each breast cup (e.g., 110 and 110') may comprise a support cup portion (e.g., 120 and 120'), a first gusset (e.g., 122 and 122') on the lateral side, and a second gusset (e.g., 124 and 124') on the medial side. Additionally, each breast cup (e.g., 110 and 110') may optionally be secured to a lower gusset (e.g., 126 and 126') at the lower margin (e.g., 134 and 134') of the breast cup and may also be secured to a shoulder strap (e.g., 114 and 114'). For simplicity, the components of the two breast cups 110 and 110' are not described separately and the discussion focuses on breast cup 110, but it should be understood that descriptions regarding one breast cup 110, shoulder strap 114, and lower gusset 126 are applicable to both sides.

Continuing with FIG. 1, different portions of the bra 100 may have differing modulus of elasticity values to provide a combination of support and a flexible, comfortable fit. For instance, the first and second gussets 122 and 124, respectively, may each have a lower modulus of elasticity compared to the support cup portion 120 of each breast cup 110. Modulus of elasticity may be defined as a measure of an object's resistance to being deformed elastically when a force is applied to it. With respect to textiles, modulus may refer to a measure of power in textile fabrics in a cross-direction, perpendicular to the warp direction. Modulus may be characterized for instance, as tensile stress of a fabric at a selected elongation (e.g., 40% elongation). Lower modulus values correspond to materials with greater elasticity and stretch capabilities. In some aspects, the modulus of elasticity, as used herein, is measured in accordance with ASTM D4964.

With lower modulus of elasticity values, the gussets 122 and 124 are able to expand and contract, allowing the shape and/or size of the breast cup 110 to change to better conform to the changing shape of the wearer's breast when tension is adjusted. At the same time, the support cup portion 120, having a higher modulus of elasticity relative to the gussets 122 and 124, allow the breast cup 110 to maintain a desired level of support. The different modulus of elasticity values may be due to, for example, knitting or weaving the gussets 122 and 124 with yarns/fibers/filaments having a lower modulus of elasticity. For example, the gussets 122 and 124 may be constructed from an elastically resilient material. An exemplary material includes elastane or a textile comprising a percentage of elastane content, such as a polyester/spandex material. The support cup portion 120 may be constructed from materials with higher modulus values relative to the gussets 122 and 124, such as a foam material or a material that does not comprise elastic yarns/fibers/filaments.

Each lower gusset 126 may similarly have a lower modulus of elasticity than the support cup portion 120 and the under band portion 112 such that each lower gusset 126 has a greater ability to expand and contract compared to the support cup portion 120 and the under band portion 112. Additionally, the under band portion 112 may have varying moduli of elasticity in different areas of the under band portion 112. For instance, a front portion 140 of the under band portion 112 may have a higher modulus of elasticity than side and/or back portions, such as portion 142. In this way, the side and/or back portion 142 may have stretch capabilities to allow the under band portion 112 to stretch around a wearer's torso while the front portion 140 stays in place. Any and all aspects, and any variation thereof, are contemplated as being within aspects herein.

Figure 2:
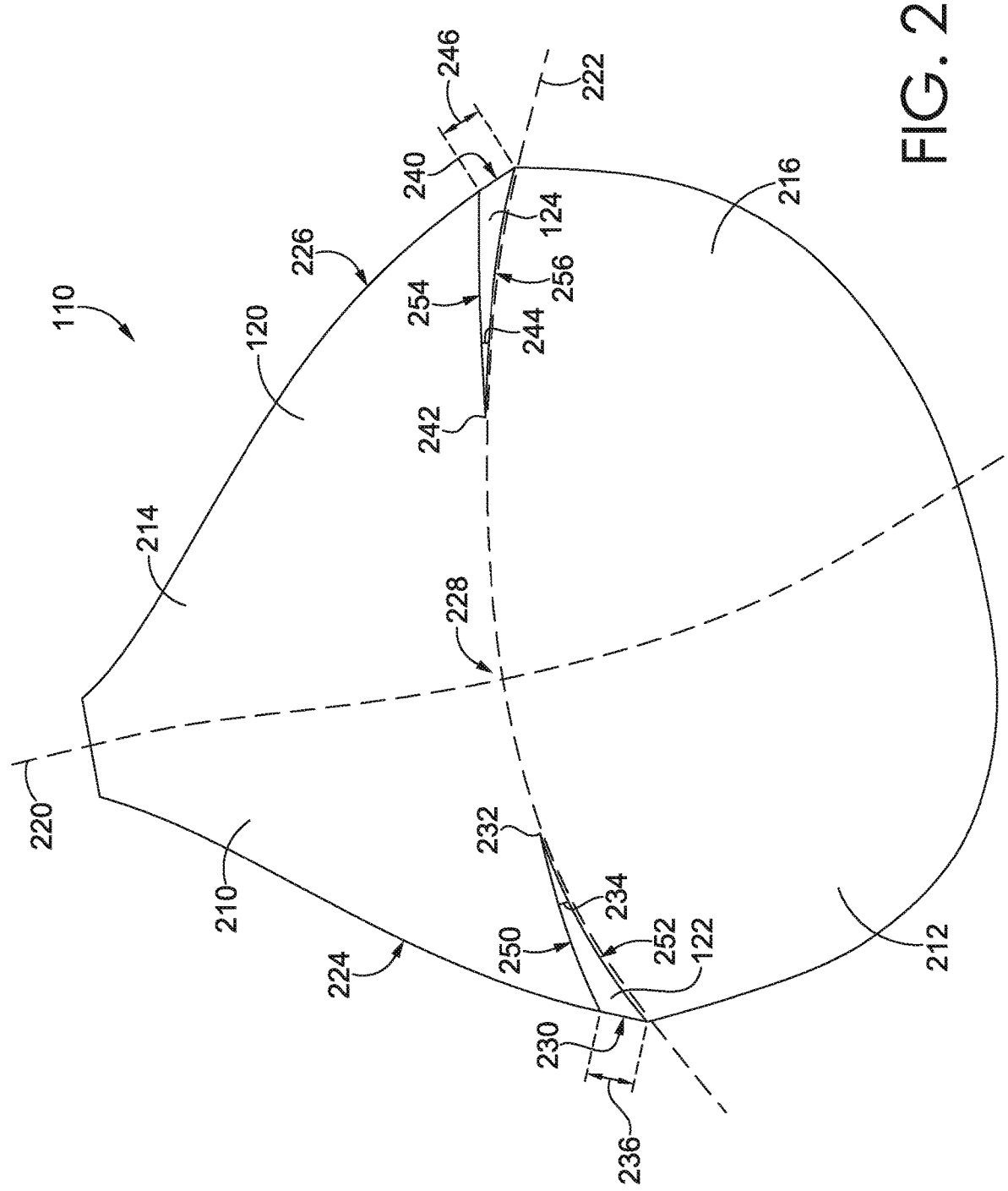
FIG. 2 illustrates a front view of one of the expandable cups of the exemplary support garment of FIG. 1.

Turning to FIG. 2, breast cup 110 is illustrated as being removed from bra 100. Areas of the support cup portion 120 of the breast cup 110 may be defined by hypothetical quadrants as indicated by dashed lines in FIG. 2. Accordingly, the support cup portion 120 may comprise an upper-lateral quadrant 210, a lower-lateral quadrant 212, an upper-medial quadrant 214, and a lower-medial quadrant 216. Quadrants 210, 212, 214, and 216 are relative areas and are not intended to demarcate precise areas of the support cup portion 120. Rather, quadrants 210, 212, 214, and 216 are intended to represent general areas of the support cup portion 120 to aid in understanding aspects herein. The quadrants 210, 212, 214, and 216 may be defined by a vertical midline 220 and a horizontal midline 222 that intersect in a central region of the support cup portion 120. When the breast cup 110 is integrated into bra 100, as shown in FIG. 1, the vertical midline 220 may bisect a shoulder strap 114 and extend downward vertically. In the aspect illustrated in FIG. 2, the vertical midline 220 and the horizontal midline 222 intersect at or near the bust point 228 of the support cup portion 120. As used herein, the term "bust point" is meant to encompass the central area, or apex, of the support cup portion 120 (e.g., the area generally overlying the nipple area of the wearer's breast). However, it is appreciated that the quadrants 210, 212, 214, and 216 may be defined by midlines intersecting elsewhere in the support cup portion 120.

As previously mentioned, the first gusset 122 may be positioned on the lateral side 130 of the breast cup 110, and the second gusset 124 may be positioned on the medial side 132. Specifically, as shown in FIG. 2, the first gusset 122 may extend or span between a first edge 250 positioned generally in the upper-lateral quadrant 210 and a second edge 252 positioned generally in the lower-lateral quadrant 212 of the support cup portion 120, while the second gusset 124 may extend between a third edge 254 positioned generally in the upper-medial quadrant 214 and a fourth edge 256 positioned generally in the lower-medial quadrant 216.

Although FIG. 2 illustrates the gussets 122 and 124 as extending between two quadrants, it is contemplated that one or both of the gussets 122 and 124 may be positioned adjacent the vertical midline 220 and/or the horizontal midline 222 such that the gussets 122 and 124 are each within one quadrant. For example, in some aspects, the first gusset 122 may be positioned within the upper-lateral quadrant 210 or within the lower-lateral quadrant 212, and in some aspects, the second gusset 124 may be positioned within the upper-medial quadrant 214 or within the lower-medial quadrant 216. As used herein, the term "adjacent" means to be within 0.1 centimeters to 5.0 centimeters of the reference vertical midline 220 and/or horizontal midline 222. Any and all aspects, and any variation thereof, are contemplated as being within aspects herein.

Further, in exemplary aspects, the first and second gussets 122 and 124, respectively, may be triangular in shape and extend from the perimeter of the support cup portion 120. For instance, a base edge 230 of the first gusset 122 may be coincident with a lateral edge 224 of the support cup portion 120, and the apex 232 opposite the base edge 230 may extend towards a central region of the support cup portion 120, such as the bust point 228. The apex 232 of the first gusset 122 may have an angle 234 between the first edge 250 and the second edge 252. Similarly, a base edge 240 of the second gusset 124 may be coincident with a medial edge 226 of the support cup portion 120 while the apex 242 of the second gusset 124 may extend towards the bust point 228. Apex 242 of the second gusset 124 may have angle 244 between the third edge 254 and the fourth edge 256. In this way, the first and second gussets 122 and 124, respectively, may extend across a central horizontal midline, such as horizontal midline 222, such that the apexes 232 and 242 are generally aligned with the horizontal midline 222.

As shown in FIG. 2, in some aspects, the first gusset 122 and the second gusset 124 comprise the same or substantially the same shape and size. However, it is contemplated that the first gusset 122 may be of a different shape and/or size than the second gusset 124. For instance, in one aspect, the second gusset 124 may be smaller than the first gusset 122, and the angle 244 and/or height 246 of base edge 240 of the second gusset 124 may be smaller than the angle 234 and/or height 236 of base edge 230 of the first gusset 122. It may further be appreciated that the shapes of the gussets 122 and 124 may comprise forms other than a triangle, including an organic shape, such as a crescent. Any and all aspects, and any variation thereof, are contemplated as being within aspects herein.

Figure 3A:
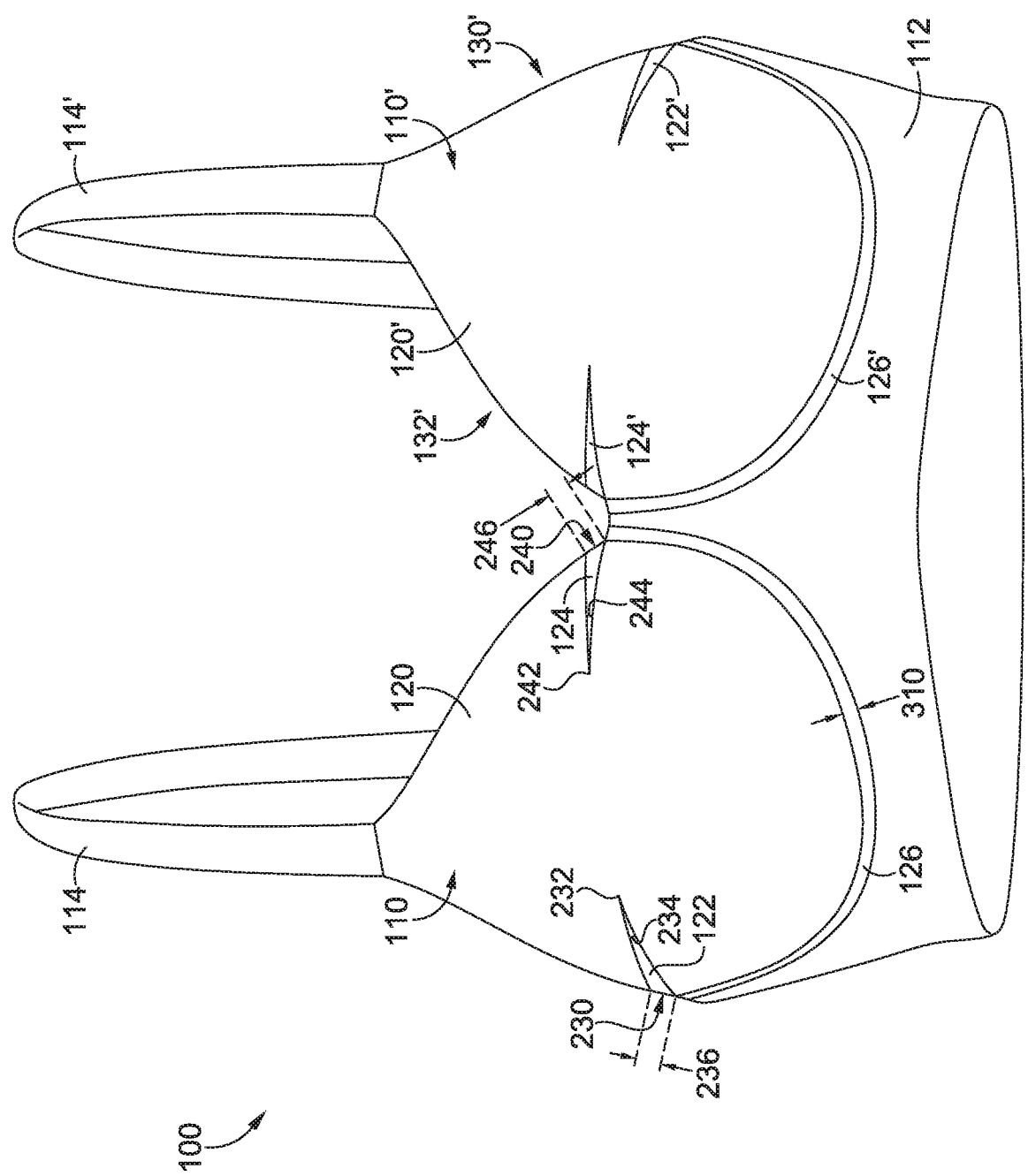
FIGS. 3A-3B illustrate front views of the exemplary support garment of FIG. 1 with the expandable cups in a first configuration and a second configuration, respectively, in accordance with an aspect herein.
Figure 3B:
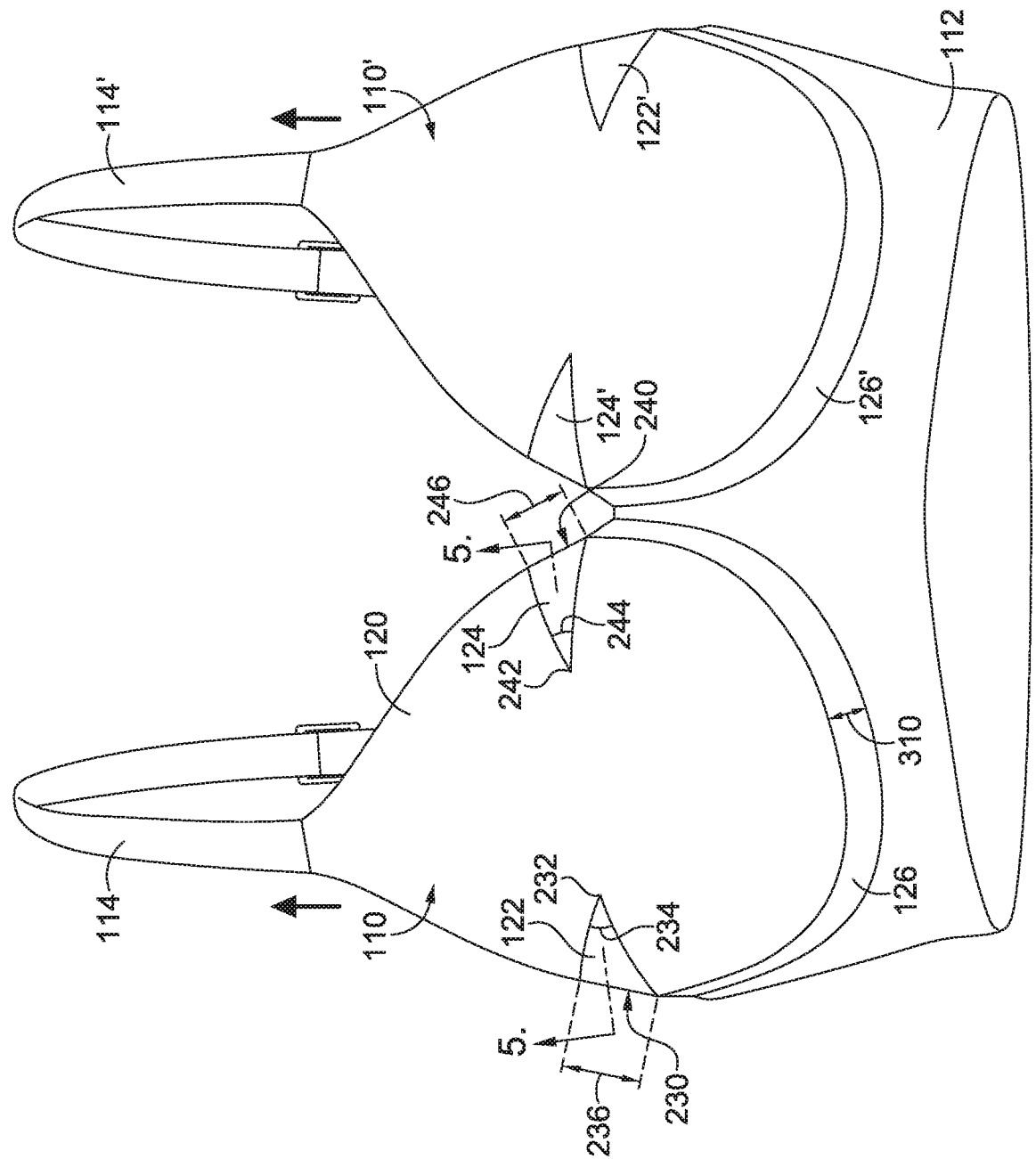
Figure 4A:
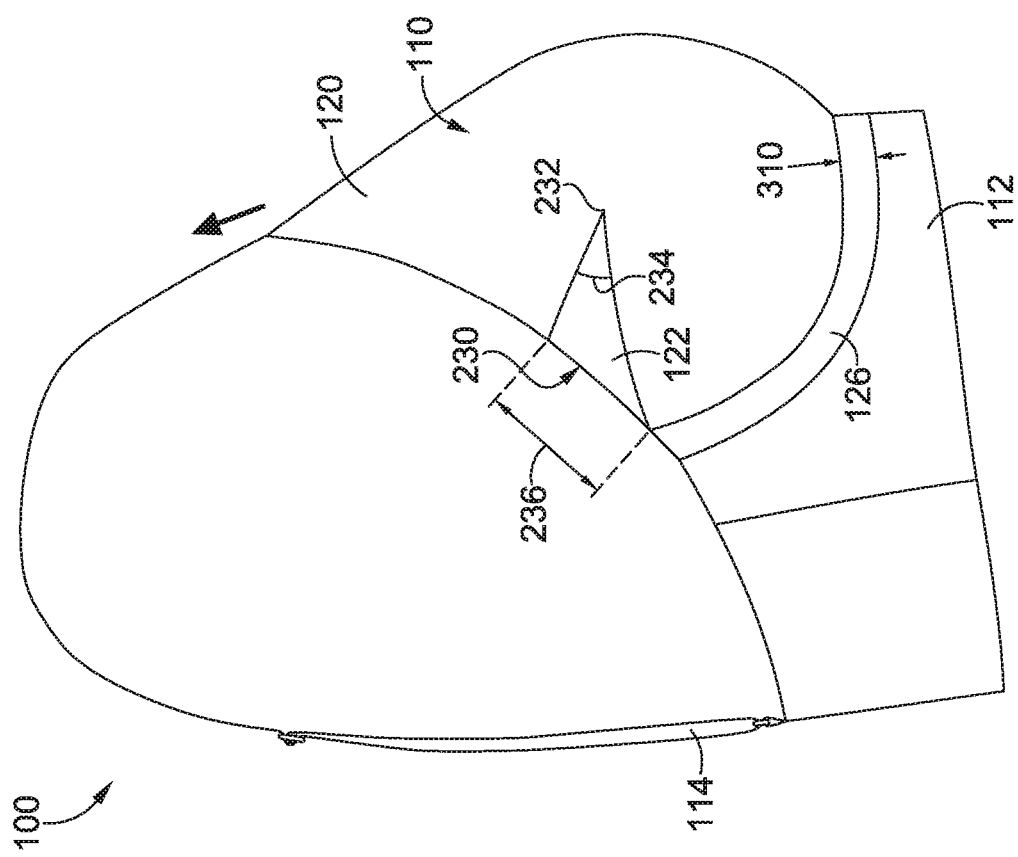
FIGS. 4A-4B illustrate side views of the exemplary support garment of FIG. 1 with the expandable cups in the first configuration and the second configuration, respectively, in accordance with an aspect herein.
Figure 4B:
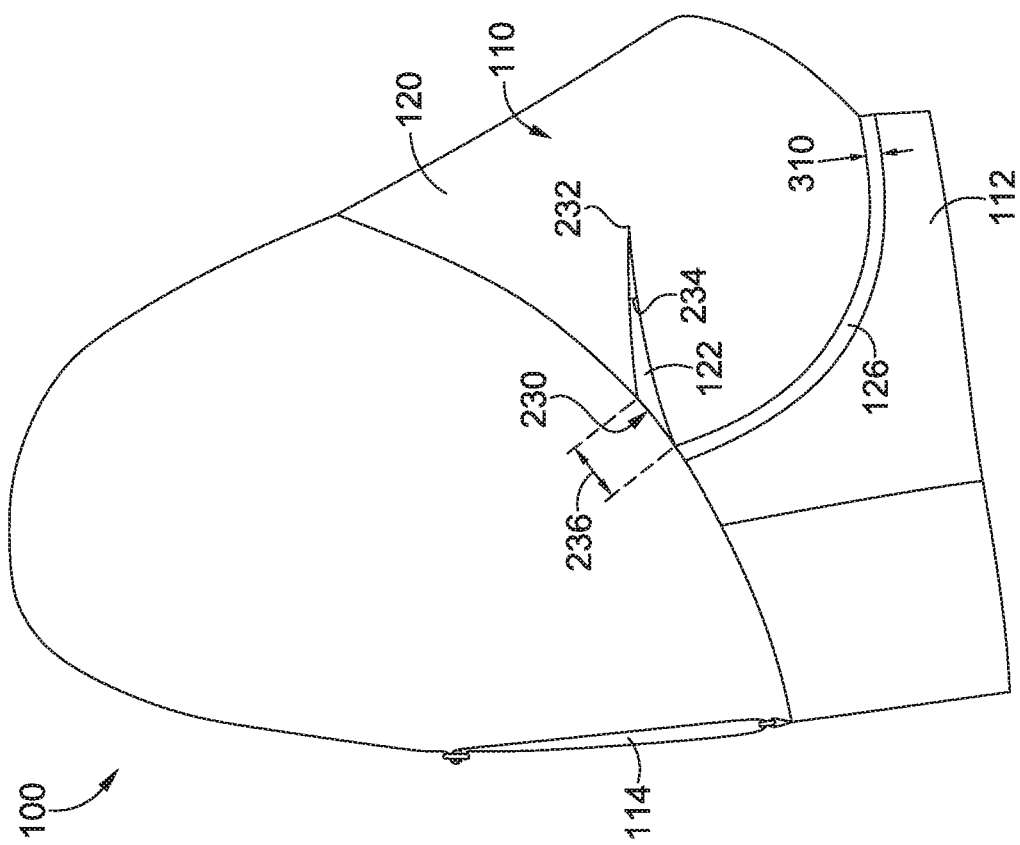

FIGS. 3A, 3B, 4A, and 4B provide views of the bra 100 as the gussets 122, 124, and 126 transition or move from a first configuration to a second configuration. FIG. 3A depicts a front view of the bra 100 with the first and second gussets, 122 and 124, in the first configuration, which may also be considered a non-expanded or contracted configuration. The lower gussets 126 are also in a first (i.e., contracted) configuration. To describe it a different way, a contracted configuration may be defined as one in which the elastic components of the gussets 122, 124, and/or 126 are in a non-stretched or minimally stretched state. In FIG. 3B, a tensioning forcing is being applied to the breast cups 110 and 110'. Generally, a tensioning force is applied to the shoulder straps 114 and 114' of the bra 100 when worn and is oriented along the longitudinal axis of each shoulder strap 114 and 114' (i.e., in a vertical direction) as indicated by arrows in FIG. 3B. In response to this tensioning force, the gussets 122, 124, and 126 may expand to the second configuration, which may also be considered an expanded or stretched configuration. To describe it a different way, a stretched configuration may be defined as one in which elastic components of the gussets 122, 124, and/or 126 are in a stretched state. Side views of the bra 100 in a first configuration and a second configuration are depicted in FIGS. 4A and 4B, respectively.

Accordingly, in some aspects, the expansion is due to a stretching of the material forming the gussets 122, 124, and 126 such that the first configuration is a non-stretched state and the second configuration is a stretched state. Further, in some aspects, additional expansion may result from the gussets 122, 124, and 126 having one or more articulating pleats such that the first configuration is also a closed state in which the pleats are folded and the second configuration is an open state in which the pleats are unfolded. Any and all aspects, and any variation thereof, are contemplated as being within aspects herein.

As illustrated in FIGS. 3A, 3B, 4A, and 4B, the first gusset 122 and the second gusset 124 in the second configuration may have structural differences compared to the first configuration. For instance, angle 234 of the apex 232 of the first gusset 122 may be greater in the second configuration than in the first configuration, and angle 244 of the apex 242 of the second gusset 124 may also be greater in the second configuration than in the first configuration. Additionally, height 236 of base edge 230 of the first gusset 122 and height 246 of the base edge 240 of the second gusset 124 may both be greater in the second configuration compared to the first configuration.

The lower gussets 126 and 126' may similarly expand from the first configuration to the second configuration. As a result, the height 310 of each lower gusset 126 (or 126') between the breast cup 110 (or 110') and the under band portion 112 may be greater in the second configuration than in the first configuration. In some aspects, the height 310 is uniform along the entire lower gusset 126 (or 126'), but it is also appreciated that the height 310 may vary in different portions of the lower gusset 126 (or 126').

The amounts in which the first gussets 122 and 122' and the second gussets 124 and 124' expand (i.e., the amount in which the angles 234 and 244 and heights 236 and 246 increase) and the lower gussets 126 and 126' expand (i.e., the amount in which the height 310 increases) may depend on the amount of tensioning force that is applied and the modulus of elasticity of the gussets 122, 122', 124, 124', 126, and 126'. Generally, higher tensioning forces and lower modulus of elasticity values result in greater expansion. Additionally, when the bra 100 is worn, the amount of expansion depends on the size and shape of the wearer's body. In some aspects, the first gussets 122 and 122' and the second gussets 124 and 124' have the same or substantially the same modulus of elasticity such that the first gussets 122 and 122' and the second gussets 124 and 124' have equal or substantially equal potentials for expansion. It is may be understood, however, that first gussets 122 and 122' and the second gussets 124 and 124' may have different modulus of elasticity values based on the desired expansion for each side of the breast cups 110 and 110'. In some aspects, the lower gussets 126 and 126' have the same modulus of elasticity as the first gussets 122 and 122' and the second gussets 124 and 124', and in other aspects, the lower gussets 126 and 126' may have a different modulus of elasticity than the first gussets 122 and 122' and the second gussets 124 and 124'. Any and all aspects, and any variation thereof, are contemplated as being within aspects herein.

When in the expanded, second configuration, the first gussets 122 and 122' provide increased amounts of surface area in the lateral portions of the breast cups 110 and 110'. When the bra 100 is worn, this expansion accommodates the movement of lateral portions of a wearer's breasts caused by increased tension being applied to the breast cups 110 and 110'. The second gussets 124 and 124' similarly increase the surface area of medial portions of the breast cups 110 and 110' such that, when the bra 100 is worn, the expanded second gussets 124 and 124' accommodate outward movement of medial portions of the wearer's breasts. The first gussets 122 and 122' and the second gussets 124 and 124' are configured to contract back to the first configuration when tension is decreased. In this way, the first gussets 122 and 122' and the second gussets 124 and 124' expand and contract to help the breast cups 110 and 110' conform to the changing shape of the wearer's breasts when tension is adjusted to provide a conformable and supportive fit.

Figure 5:
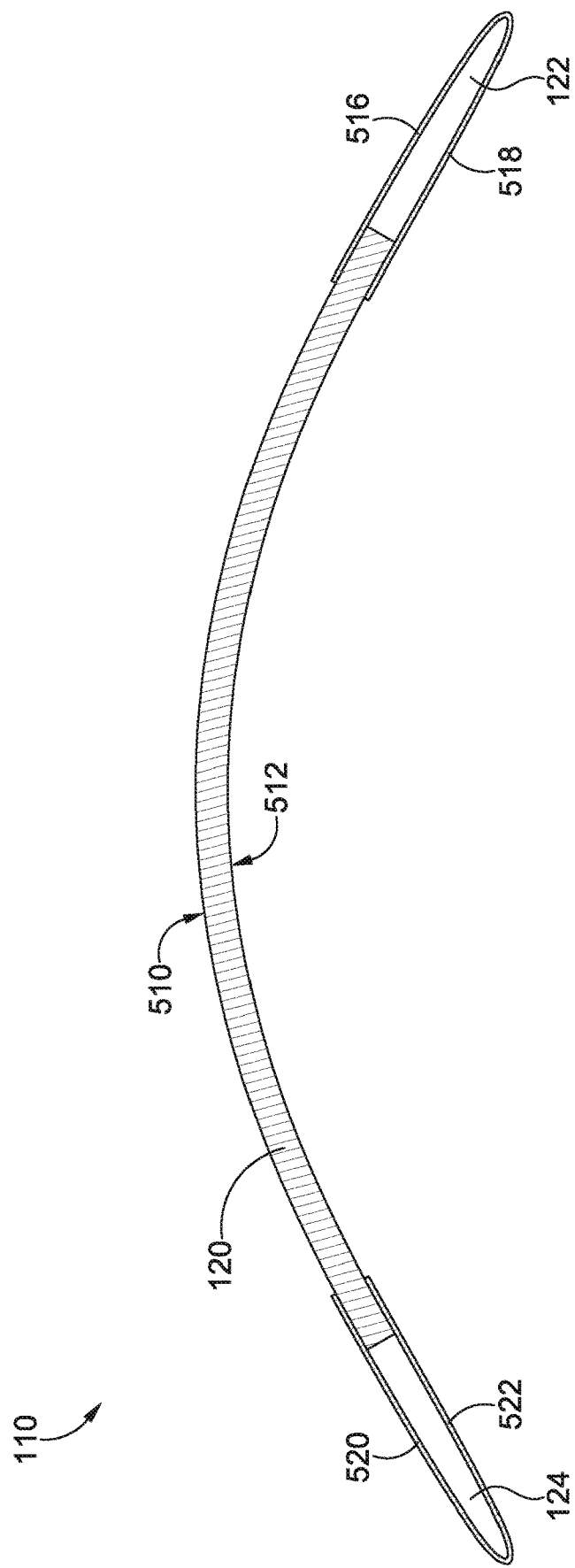
FIG. 5 illustrates a cross-sectional view of an expandable cup taken along cut line-5-5 in FIG. 3B, in accordance with an aspect herein.

Turning to FIG. 5, a cross-sectional view of breast cup 110 taken at cut line 5-5 in FIG. 3B is provided. As illustrated in this cross-sectional view, the first gusset 122 and second gusset 124 may comprise panels (textile panels, or other types of elastomeric panels) secured to both sides of the support cup portion 120. A first textile layer 516 of the first gusset 122 may be secured to a lateral portion of a first surface 510, such as an exterior-facing surface, of the support cup portion 120, and a second textile layer 518 of the first gusset 122 may be secured to a lateral portion of a second surface 512 opposite of the first surface 510, such as an interior-facing surface of the support cup portion 120. Similarly, a first textile layer 520 of the second gusset 124 may be secured to a medial portion of the first surface 510 of the support cup portion 120, and a second textile layer 522 of the second gusset 124 may be secured to a medial portion of the second surface 512 opposite of the first surface 510. The textile layers 516, 518, 520, and 522 may be permanently affixed to the support cup portion 120 through, for instance, bonding, adhesives, stitching, and the like.

As depicted in FIG. 5, the first textile layer 516 and the second textile layer 518 of the first gusset 122 may be different portions of the same textile panel that is folded to form two textile layers. Similarly, the first textile layer 520 and the second textile layer 522 of the second gusset 124 may be different portions of the same textile panel that is folded over. In other aspects, the first textile layers 516 and 520 may be different panels than the second textile layers 518 and 522. In some aspects, material forming the first and second gussets 122 and 124, respectively, may extend across the entire first surface 510 and the entire second surface 512 of the support cup portion 120, and the gussets 122 and 124 may be defined as regions of the material not enclosing the support cup portion 120. In other words, the first textile layers 516 and 520 may comprise the same textile panel, and the second textile layers 518 and 522 may comprise the same textile panel, which may or may not be the same as the textile panel forming the first textile layers 516 and 520. Any and all aspects, and any variation thereof, are contemplated as being within aspects herein.

Figure 6:
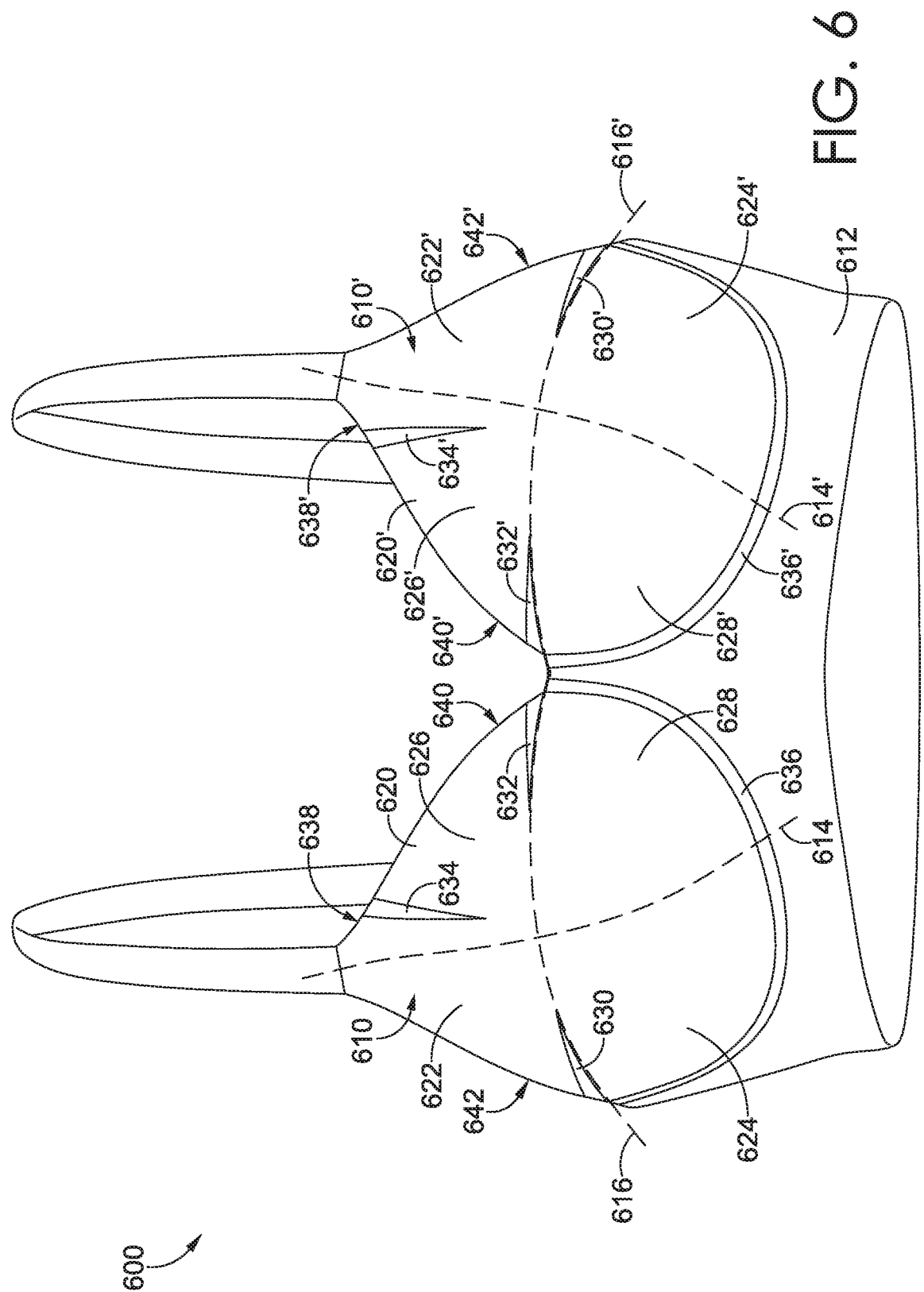
FIG. 6 depicts an exemplary support garment in the form of a bra having expandable cups with an alternative configuration, in accordance with an aspect herein.

FIG. 6 illustrates a bra 600 with breast cups 610 and 610' having an alternative configuration in accordance with aspects herein. The breast cups 610 and 610' each comprise a support cup portion (e.g., 620 and 620') having an upper-lateral quadrant (e.g., 622 and 622'), a lower-lateral quadrant (e.g., 624 and 624'), an upper-medial quadrant (e.g., 626 and 626'), and a lower-medial quadrant (e.g., 628 and 628') as defined by vertical midline (e.g., 614 and 614') and horizontal midline (e.g., 616 and 616'). Similar to bra 100, each breast cup (e.g., 610 and 610') comprises a first gusset (e.g., 630 and 630') extending between the upper-lateral quadrant (e.g., 622 and 622') and the lower-lateral quadrant (e.g., 624 and 624') and a second gusset (e.g., 632 and 632') extending between the upper-medial quadrant (e.g., 626 and 626') and the lower-medial quadrant (e.g., 628 and 628'). Each breast cup (e.g., 610 and 610') further includes a third gusset (e.g., 634 and 634') generally positioned within one or more upper quadrants (e.g., upper-lateral quadrant 622 and upper-medial quadrant 626). For example, the third gussets 634 and 634' may be generally positioned within the upper-medial quadrants 626 and 626', as shown in FIG. 6. It will be appreciated that the third gussets 634 and 634' may also be positioned such that each extends between the respective upper-lateral quadrant 622 and 622' and the upper-medial quadrant 626 and 626'. The third gussets 634 and 634' may comprise a triangular shape with a base edge coincident with a superior edge (e.g., 638 and 638') of the respective support cup portion 620 and 620', which may also be considered a superior portion of a medial edge (e.g., 640 and 640') or a superior portion of a lateral edge (e.g., 642 and 642'), and the third gussets 634 and 634' may each extend towards a central region of the respective support cup portions 620 and 620'.

The gussets 630, 630', 632, 632', 634, and 634' may each have a lower modulus of elasticity than the respective support cup portion 620 and 620' and may each be configured to expand from a first configuration to a second configuration in a similar manner as described with respect to gussets 122, 122', 124, and 124' of bra 100. Further, gussets 630, 630', 632, 632', 634, and 634' may also have a similar construction as gussets 122, 122', 124, and 124'. In some aspects, the bra 600 also comprises lower gussets 636 and 636' interposed between the breast cups 610 and 610' and an under band portion 612. Lower gussets 636 and 636' may be configured to expand from a first configuration to a second configuration in a manner similar to lower gussets 126 and 126' of bra 100.

The third gussets 634 and 634' may be configured to expand to a second configuration, such as a stretched state, when tension is applied to the breast cups 610 and 610'. Similar to lateral and medial portions, the superior portions of a wearer's breasts may be displaced in an upward direction when the wearer's breasts are compressed inward as a result of increased tension. By expanding to the second configuration, the third gussets 634 and 634' help the breast cups 610 and 610' better conform to this change in the wearer's breast shape by providing more area within the breast cups 610 and 610' at the superior regions. Using the third gusset 634 as an example, as mentioned, the third gusset 634 may be generally positioned within the upper-medial quadrant 626 such that it is closer to the medial side 640 than the lateral side 642 of the breast cup 610, but the third gusset 634 may also be positioned such that it spans between the upper-medial quadrant 626 and the upper-lateral quadrant 622.

Additionally, the third gusset 634 may comprise a triangular shape similar to the first gusset 630 and the second gusset 632. Because upward tension to the breast cup 610 naturally results in upward movement of the breast cup 610, the third gusset 634 may be smaller than the first gusset 630 and the second gusset 632 in some aspects to provide less expansion. Additionally or in the alternative to the smaller size, the third gusset 634 may have a higher modulus of elasticity than the first gusset 630 and the second gusset 632 to provide less expansion. In other aspects, the size, shape, and/or modulus of elasticity is uniform among gussets 630, 632, and 634 and gussets 630', 632', and 634'.

Aspects of the present invention have been described with the intent to be illustrative rather than restrictive. Alternative aspects will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims.

What is claimed is:

1. A breast cup comprising:
    a support cup portion comprising an upper-lateral quadrant, an upper-medial quadrant, a lower-lateral quadrant, and a lower-medial quadrant;
    a first gusset expandable from a first configuration to a second configuration, the first gusset secured to the support cup portion such that it extends between at least a portion of the upper-lateral quadrant and a portion of the lower-lateral quadrant of the support cup portion; and
    a second gusset expandable from a first configuration to a second configuration, the second gusset secured to the support cup portion such that it extends between at least a portion of the upper-medial quadrant and a portion of the lower-medial quadrant of the support cup portion,
    wherein the first gusset has a first modulus of elasticity and the second gusset has a second modulus of elasticity, the first modulus of elasticity and the second modulus of elasticity both being less than a third modulus of elasticity of the support cup portion.

2. The breast cup of claim 1, wherein the first gusset comprises a first triangular gusset and the second gusset comprises a second triangular gusset.

3. The breast cup of claim 2, wherein the first gusset extends from a lateral edge of the support cup portion toward a central region of the support cup portion and the second gusset extends from a medial edge of the support cup portion toward the central region of the support cup portion.

4. The breast cup of claim 3, wherein a base edge of the first triangular gusset is coincident with the lateral edge of the support cup portion and an apex of the first triangular gusset extends towards the central region, and wherein a base edge of the second triangular gusset is coincident with the medial edge of the support cup portion and an apex of the second triangular gusset extends towards the central region.

5. The breast cup of claim 1, wherein the first gusset and the second gusset extend across a central horizontal midline of the support cup portion.

6. The breast cup of claim 1, wherein first modulus of elasticity is the same as the second modulus of elasticity.

7. The breast cup of claim 1, further comprising a third gusset expandable from a first configuration to a second configuration, the third gusset secured to the support cup portion such that it extends within one or more upper quadrants of the support cup portion, the third gusset having a fourth modulus of elasticity that is less than the third modulus of elasticity of the support cup portion.

8. A support garment comprising:
    a first breast cup comprising:
        a first support cup portion having an upper-lateral quadrant, an upper-medial quadrant, a lower-lateral quadrant, and a lower-medial quadrant,
        a first gusset of the first breast cup expandable from a first configuration to a second configuration, the first gusset of the first breast cup being secured to the first support cup portion such that it extends between at least a portion of the upper-lateral quadrant and a portion of the lower-lateral quadrant of the first support cup portion, and
        a second gusset of the first breast cup expandable from a first configuration to a second configuration, the second gusset of the first breast cup being secured to the first support cup portion such that it extends between at least a portion of the upper-medial quadrant and a portion of the lower-medial quadrant of the first support cup portion, the first gusset and the second gusset of the first breast cup each having a lower modulus of elasticity than the first support cup portion;
    a second breast cup comprising:
    a second support cup portion having an upper-lateral quadrant, an upper-medial quadrant, a lower-lateral quadrant, and a lower-medial quadrant,
        a first gusset of the second breast cup expandable from a first configuration to a second configuration, the first gusset of the second breast cup being secured to the second support cup portion such that it extends between at least a portion of the upper-lateral quadrant and a portion of the lower-lateral quadrant of the second support cup portion, and
        a second gusset of the second breast cup expandable from a first configuration to a second configuration, the second gusset of the second breast cup being secured to the second support cup portion such that it extends between at least a portion of the upper-medial quadrant and a portion of the lower-medial quadrant of the second support cup portion, the first gusset and the second gusset of the second breast cup each having a lower modulus of elasticity than the second support cup portion;

an under band portion extending inferiorly from the first breast cup and the second breast cup;

a first strap extending from the first breast cup; and a second strap extending from the second breast cup.

9. The support garment of claim 8, wherein the first gusset and the second gusset of the first breast cup and the first gusset and the second gusset of the second breast cup each comprise a triangular shape.

10. The support garment of claim 9, wherein the first gusset and the second gusset of the first breast cup both extend from a perimeter of the first support cup portion toward a central region of the first support cup portion, and wherein the first gusset and the second gusset of the second breast cup both extend from a perimeter of the second support cup portion toward a central region of the second support cup portion.

11. The support garment of claim 8, wherein the first configuration is a non-stretched state and the second configuration is a stretched state.

12. The support garment of claim 8, wherein each of the first strap and the second strap have one or more tension adjusting mechanisms.

13. The support garment of claim 8 further comprising a first lower gusset interposed between the first breast cup and the under band portion and having a lower modulus of elasticity than the first support cup portion, and a second lower gusset interposed between the second breast cup and the under band portion and having a lower modulus of elasticity than the second support cup portion.

14. The support garment of claim 8, wherein the first gusset and the second gusset of the first breast cup and the first gusset and the second gusset of the second breast cup are constructed from an elastically resilient material.

15. The support garment of claim 8, wherein the first support cup portion and the second support cup portion are constructed from a foam material.

16. A breast cup comprising:

a support cup portion comprising a first surface and a second surface opposite the first surface, the support cup portion defined by an upper-lateral quadrant, an upper-medial quadrant, a lower-lateral quadrant, and a lower-medial quadrant;

a first gusset expandable from a first configuration to a second configuration, the first gusset being secured to the support cup portion such that it extends between at least a portion of the upper-lateral quadrant and a portion of the lower-lateral quadrant;

a second gusset expandable from a first configuration to a second configuration, the second gusset being secured to the support cup portion such that it extends between at least a portion of the upper-medial quadrant and a portion of the lower-medial quadrant; and a third gusset expandable from a first configuration to a second configuration, the third gusset being secured to the support cup portion such that it extends within the upper-medial quadrant, wherein the first gusset, the second gusset, and the third gusset each have a lower modulus of elasticity than the support cup portion.

17. The breast cup of claim 16, wherein each of the first gusset, the second gusset, and the third gusset comprises a first textile layer secured to the first surface of the support cup portion and a second textile layer secured to the second surface of the support cup portion.

18. The breast cup of claim 16, wherein the first gusset extends from a lateral edge of the support cup portion to a central region of the support cup portion, the second gusset extends from a medial edge of the support cup portion to the central region, and the third gusset extends from a superior edge of the support cup portion to the central region.

19. The breast cup of claim 16, wherein the first gusset, the second gusset, and the third gusset have the same modulus of elasticity.

20. The breast cup of claim 16, wherein the first gusset, the second gusset, and the third gusset comprise different sizes.

* * * * *